United States Patent
Kumar et al.

(10) Patent No.: US 12,233,803 B2
(45) Date of Patent: Feb. 25, 2025

(54) EVENT-BASED CONNECTED VEHICLE CONTROL AND RESPONSE SYSTEMS

(71) Applicant: Allstate Insurance Company, Northbrook, IL (US)

(72) Inventors: Surender Kumar, Palatine, IL (US); Clint J. Marlow, Barrington, IL (US); Timothy W. Gibson, Barrington, IL (US); Mark V. Slusar, Chicago, IL (US); Chris Wiklund, Downers Grove, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 18/513,041

(22) Filed: Nov. 17, 2023

(65) Prior Publication Data

US 2024/0092299 A1  Mar. 21, 2024

Related U.S. Application Data

(63) Continuation of application No. 17/584,174, filed on Jan. 25, 2022, now Pat. No. 11,878,643, which is a
(Continued)

(51) Int. Cl.
*B60R 21/013* (2006.01)
*B60R 21/00* (2006.01)
(Continued)

(52) U.S. Cl.
CPC ......... *B60R 21/013* (2013.01); *G05D 1/0088* (2013.01); *G05D 1/228* (2024.01);
(Continued)

(58) Field of Classification Search
CPC ..... B60R 21/013; H04L 67/52; H04L 67/535; H04L 67/12; H04L 69/40; G05D 1/228;
(Continued)

(56) References Cited

U.S. PATENT DOCUMENTS 7,272,357 B2   9/2007   Nishiga et al.
7,348,895 B2   3/2008   Lagassey
(Continued)

FOREIGN PATENT DOCUMENTS

EP   3176666 A1   6/2017

OTHER PUBLICATIONS

Dec. 13, 2018—(US) Non-Final Office Action—U.S. Appl. No. 15/667,484 (006591.01483), 22 Pages.
(Continued)

*Primary Examiner* — Yazan A Soofi
(74) *Attorney, Agent, or Firm* — Polsinelli PC

(57) ABSTRACT

Event-based connected vehicle control and response systems, methods, and apparatus are disclosed. An example method comprises identifying the occurrence of an event, storing first data corresponding to apparatus operation for a first threshold amount of time prior to the event, during the occurrence of the event, and for a second threshold amount of time after the event, determining whether a responsive object is involved in or near the event, in response to determining that the responsive object is involved in or near the event, transmitting the first data to the responsive object, and receiving, from the responsive object, second data, analyzing the first data and the second data to determine a party at-fault for the event, aggregating the first data and second data into an event report, and causing, automatically, a response to be initiated through an entity associated with the party at-fault.

20 Claims, 8 Drawing Sheets

Related U.S. Application Data continuation of application No. 16/704,505, filed on Dec. 5, 2019, now Pat. No. 11,230,243, which is a continuation of application No. 15/667,484, filed on Aug. 2, 2017, now Pat. No. 10,518,729.

(51) Int. Cl.

| | | |
|---|---|---|
| *G05D 1/00* | (2024.01) | |
| *G05D 1/228* | (2024.01) | |
| *G06N 20/00* | (2019.01) | |
| *G06Q 40/08* | (2012.01) | |
| *G07C 5/00* | (2006.01) | |
| *G07C 5/08* | (2006.01) | |
| *G08G 1/00* | (2006.01) | |
| *G08G 1/01* | (2006.01) | |
| *G08G 1/16* | (2006.01) | |
| *H04L 67/12* | (2022.01) | |
| *H04L 67/50* | (2022.01) | |
| *H04L 67/52* | (2022.01) | |
| *H04L 69/40* | (2022.01) | |

(52) U.S. Cl.
CPC ............. *G07C 5/008* (2013.01); *G07C 5/085* (2013.01); *G08G 1/0112* (2013.01); *G08G 1/0116* (2013.01); *G08G 1/0129* (2013.01); *G08G 1/0133* (2013.01); *G08G 1/0141* (2013.01); *G08G 1/16* (2013.01); *G08G 1/162* (2013.01); *G08G 1/164* (2013.01); *G08G 1/205* (2013.01); *H04L 67/12* (2013.01); *H04L 67/52* (2022.05); *H04L 67/535* (2022.05); *H04L 69/40* (2013.01); *B60R 2021/0027* (2013.01); *G06N 20/00* (2019.01); *G06Q 40/08* (2013.01)

(58) Field of Classification Search
CPC .... G05D 1/0088; G07C 5/0088; G07C 5/085; G08G 1/0112; G08G 1/0116; G08G 1/0129; G08G 1/0133; G08G 1/0141; G08G 1/16; G08G 1/162; G08G 1/164; G08G 1/205
USPC .......................................................... 701/45
See application file for complete search history.

(56) References Cited

U.S. PATENT DOCUMENTS

| | | | |
|---|---|---|---|
| 8,063,793 B2 | 11/2011 | Shrum, Jr. | |
| 8,255,144 B2 | 8/2012 | Breed et al. | |
| 8,280,583 B2 | 10/2012 | Stahlin et al. | |
| 8,520,695 B1 | 8/2013 | Rubin et al. | |
| 8,781,442 B1 | 7/2014 | Link, II | |
| 8,799,034 B1* | 8/2014 | Brandmaier | G07C 5/008 705/4 |
| 9,019,092 B1 | 4/2015 | Brandmaier et al. | |
| 9,159,231 B2 | 10/2015 | Noh | |
| 9,269,268 B2 | 2/2016 | Bowers et al. | |
| 9,390,451 B1 | 7/2016 | Slusar | |
| 9,430,944 B2 | 8/2016 | Grimm et al. | |
| 9,475,500 B2 | 10/2016 | Grimm et al. | |
| 10,387,962 B1* | 8/2019 | Potter | B60R 25/04 |
| 10,535,103 B1* | 1/2020 | Tofte | H04N 7/185 |
| 2012/0166229 A1* | 6/2012 | Collins | G06Q 40/08 705/4 |
| 2013/0222133 A1 | 8/2013 | Schultz et al. | |
| 2015/0127733 A1 | 5/2015 | Ding et al. | |
| 2016/0133130 A1 | 5/2016 | Grimm et al. | |
| 2016/0323741 A1 | 11/2016 | Lee et al. | |
| 2016/0332570 A1 | 11/2016 | Kunkel | |
| 2017/0012657 A1 | 1/2017 | Stahlin et al. | |
| 2017/0017734 A1 | 1/2017 | Groh et al. | |
| 2017/0053461 A1 | 2/2017 | Pal et al. | |
| 2017/0138108 A1 | 5/2017 | Kothari | |
| 2018/0053401 A1 | 2/2018 | Martin et al. | |
| 2019/0039545 A1 | 2/2019 | Kumar et al. | |

OTHER PUBLICATIONS

Aug. 7, 2019—(US) Notice of Allowance—U.S. Appl. No. 15/667,484 (006591.01483), 10 Pages.

Dec. 30, 2020—(US) Notice of Allowance—U.S. Appl. No. 16/364,856 (006591.02041), 9 Pages.

Sep. 4, 2020—(US) Non-Final Office Action—U.S. Appl. No. 16/364,856 (006591.02041), 16 Pages.

Mar. 23, 2021—(CA) Office Action—Application No. 3071646 (006591.02362), 4 pages.

Apr. 18, 2023—(US) Non-Final Office Action—U.S. Appl. No. 17/244,189, 19 Pages.

Aug. 17, 2023—(US) Notice of Allowance—U.S. Appl. No. 17/584,174, 12 Pages.

Feb. 1, 2023—(US) Non-Final Office Action—U.S. Appl. No. 17/584,174, 10 Pages.

Extended European Search Report for European Application No. 18840984.1 dated Mar. 29, 2021, 9 pages.

Fogue M., et al., "Automatic Accident Detection: Assistance Through Communication Technolohies and vehicles," IEEE, vol. 7 (3), Sep. 2012, Retrieved from URL: http://ieeexplore.ieee.org/document/6269155/?reload=true on Jan. 3, 2017, pp. 1-3.

International Preliminary Report on Patentability for International Application No. PCT/US2018/044814, mailed Feb. 13, 2020, 6 pages.

International Search report and Written Opinion for International Application No. PCT/US2018/044814, mailed Oct. 22, 2018, 7 pages.

Motsinger C., et al., "A Review of Vehicle-to-Vehicle and Vehicle-to-Infrastructure Initiatives," The Clemson University Vehicular Electronics Laboratory, Retrieved from URL: http://www.cvel.clemson.edu/Reports/CVEL-07-U03.pdf, Oct. 3, 2007, pp. 1-24.

Sanguesa J.A., et al., "Sensing Traffic Density Combining V2V and V21 Wireless Communications," Sensors, Dec. 16, 2015, vol. 15, MDPI, Basel, Switzerland, Retrieved from www.mdpi.com/1424-8220/15/12/29889/pdf, pp. 31794-31810, 17 pages.

\* cited by examiner

EVENT-BASED CONNECTED VEHICLE CONTROL AND RESPONSE SYSTEMS

CROSS REFERENCE TO RELATED APPLICATIONS

This application is a continuation of and claims priority to U.S. application Ser. No. 17/584,174 filed Jan. 25, 2022, which is a continuation of and claims priority to U.S. application Ser. No. 16/704,505 filed Dec. 5, 2019, which is a continuation of U.S. application Ser. No. 15/667,484 filed Aug. 2, 2017. Each of these applications is specifically incorporated by reference in its entirety herein.

TECHNICAL FIELD

Aspects of the present disclosure generally relate to event-based connected vehicle control and response systems.

BACKGROUND

Often, an event occurs involving one or more vehicles. Numerous entities may be involved in the aftermath of an event, elongating the process of restoring the environment in which the event occurs. For example, one or more additional vehicles are often drawn to an event to clear and/or repair damage to the vehicles and/or environment. Currently, the vehicles involved in the event, or in the vicinity, do little to impact such restoration and instead are a burden on the restoration process

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to identifying events including vehicle and/or infrastructure accidents and/or near misses, determining an at-fault party involved in the events, and automatically initiating a response to the at-fault determination. An example system comprises a first vehicle comprising a first plurality of vehicle operation sensors to detect vehicle and environment parameters, a second vehicle comprising a second plurality of vehicle operation sensors, and a server comprising at least one processor, and memory comprising instructions that, when executed by the at least one processor, cause the server to identify an occurrence of an event involving the first vehicle and the second vehicle, store first data acquired by the first plurality of vehicle operation sensors for a first threshold amount of time prior to the event, during the occurrence of the event, and for a second threshold amount of time after the event, store second data acquired by the second plurality of vehicle operation sensors for a third threshold amount of time prior to the event, during the occurrence of the event, and for a fourth threshold amount of time after the event, identify, based on the first data and the second data, which vehicle of the first vehicle or the second vehicle is at-fault, aggregate the first data and second data into an event report, and initiate a response via a system associated with the vehicle identified as at-fault.

An example apparatus comprises one or more processors, and memory storing instructions that, when executed by the one or more processors, cause the apparatus to at least identify the occurrence of an event, store first data corresponding to apparatus operation for a first threshold amount of time prior to the event, during the occurrence of the event, and for a second threshold amount of time after the event, determine whether a responsive object is involved in or near the event, in response to determining that the responsive object is involved in or near the event, transmit the first data to the responsive object, and receive, from the responsive object, second data, analyze the first data and the second data to determine an at-fault party involved in the event, aggregate the first data and second data into an event report, and cause, automatically, a response to be initiated through a system associated with the at-fault party involved in the event.

An example method comprises identifying the occurrence of an event, storing first data corresponding to apparatus operation for a first threshold amount of time prior to the event, during the occurrence of the event, and for a second threshold amount of time after the event, determining whether a responsive object is involved in or near the event, in response to determining that the responsive object is involved in or near the event, transmitting the first data to the responsive object, and receiving, from the responsive object, second data, analyzing the first data and the second data to determine an at-fault party involved in the event, aggregating the first data and second data into an event report, and causing, automatically, a response to be initiated through a system associated with the at-fault party involved in the event.

DETAILED DESCRIPTION

Figure 1:
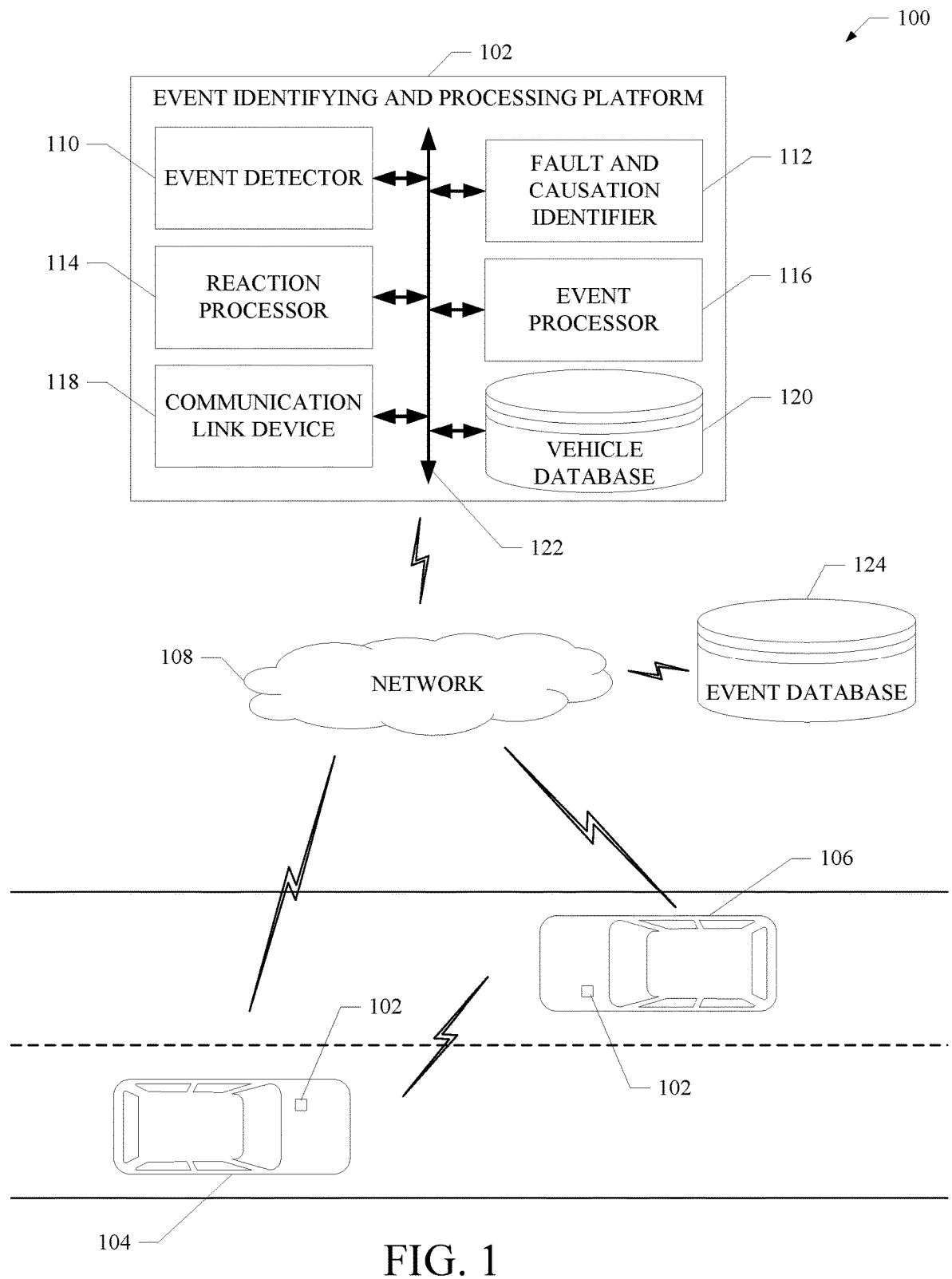
FIG. 1 illustrates an example environment comprising an event identifying and processing platform in communication with one or more vehicles connected over a network in accordance with one or more aspects described herein.

In the following description of the various embodiments, reference is made to the accompanying drawings, which form a part hereof, and in which is shown by way of illustration, various embodiments of the disclosure that may be practiced. It is to be understood that other embodiments may be utilized.

Aspects of the disclosure relate to identifying events including vehicle and/or infrastructure accidents and/or near misses, determining at least one at-fault party involved in the events, and, in at least some examples, automatically initiating a response to the at-fault determination. Additionally, the systems, methods, and apparatus disclosed herein may automatically populate one or more event reports for emergency services (e.g., emergency medical technicians (EMTs), police, firefighters, etc.), vehicle repair services (e.g., body shop, tow trucks, etc.), infrastructure repair services (e.g., road sign repair, traffic signal repair, guardrail repair, pothole repair, etc.), etc.

In some examples, one or more vehicles and/or infrastructure devices involved in and/or in the vicinity of an event collect and/or store data corresponding to date, time, speed of vehicles involved in the event, vehicle identification number, license plate information, route/location of the event (e.g., latitude and longitude, address, street, intersection, etc. based on a global positioning system in the vehicle and/or a user device), sensor and imagery data, whether safety features are equipped/activated in a vehicle, national highway traffic safety administration (NHTSA) level of autonomy of the vehicle, whether the vehicle or driver was in control of the vehicle, communications from the vehicle to the driver, communication from vehicle to other vehicles, communication from vehicle to infrastructure devices, known driving conditions, known weather conditions, type of damage, severity of damage, condition of the vehicle, registered vehicle owners/drivers, number of passengers, whether seat belts were utilized, passenger weight, vehicle braking, estimate cost to replace/repair damage, etc. At least some data may be collected via one or more sensors or cameras. Additionally, or alternatively, at least some data may be programmed into and/or store on the respective vehicles and/or infrastructure devices. In some examples, the amount of data that is collected, stored, processed, and/or transmitted may be proportionate to the severity of the event, as further disclosed herein.

To collect or otherwise obtain the above described data, each vehicle and/or infrastructure device may comprise one or more sensors or may be in communication with one or more external devices (e.g., a mobile device owned by a driver of a vehicle) comprising one or more sensors, user profiles, or other data. For example, each vehicle and/or infrastructure device may comprise odometers, global positioning systems, cameras, level sensors (to detect rollovers), force/pressure/impact sensors, range/proximity sensors, various wireless network interfaces capable of detect access to different data networks, mobile networks, and other mobile devices (e.g., via Bluetooth), clocks, and/or movement sensors such as, for example, accelerometers, speedometers, compasses, and gyroscopes.

Additional vehicle sensors may detect and store data relating to the maintenance of the vehicle, such as the engine status, oil level, engine coolant temperature, odometer reading, the level of fuel in the fuel tank, the level of charge in the battery (e.g., for hybrid or electric cars), engine revolutions per minute (RPMs), and/or tire pressure. In some examples, the vehicles also may include sensors configured to collect data associated with a driver's movements or the condition of a driver, for example, sensors that monitor a driver's movements, such as the driver's eye position and/or head position, etc. Additional safety or guidance-assistance features may be included in some vehicles, detecting and storing data such as lane departures, activation of adaptive cruise control, blind spot alerts, etc. The sensors may be installed during vehicle manufacture or as an after-market addition.

Each vehicle may comprise communication links to establish vehicle-to-vehicle ("V2V") communications. As disclosed herein, V2V communication may be accomplished with a short-range vehicle-based data transmission systems configured to transmit vehicle operational data to other nearby vehicles, and to receive vehicle operational data from other nearby vehicles. In some examples, the communication system may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication systems need not use DSRC, and may be implemented using other short-range wireless protocols in other examples, such as wireless local area network (WLAN) communication protocols (e.g., IEEE 802.11), Bluetooth (e.g., IEEE 802.15.1), or one or more of the Communication Access for Land Mobiles (CALM) wireless communication protocols and air interfaces. The vehicle to vehicle transmissions between the short-range communication systems may be sent via DSRC, Bluetooth, satellite, GSM infrared, IEEE 802.11, WiMAX, RFID, and/or any suitable wireless communication media, standards, and protocols. In certain systems, short-range communication systems may include specialized hardware installed in vehicles (e.g., transceivers, antennas, etc.), while in other examples the communication systems may be implemented using existing vehicle hardware components (e.g., radio and satellite equipment, navigation computers) or may be implemented by software running on the mobile devices of drivers and passengers within the vehicles.

The range of V2V communications between vehicles may depend on the wireless communication standards and protocols used, the transmission/reception hardware (e.g., transceivers, power sources, antennas), and other factors. Short-range V2V communications may range from just a few feet to many miles, and different types of driving behaviors may be determined depending on the range of the V2V communications. For example, V2V communications ranging only a few feet may be sufficient for a driving analysis computing device in one vehicle to determine that another vehicle is tailgating or cut-off the vehicle, whereas longer communications may allow the device to determine additional types of driving behaviors (e.g., vehicle spacing, yielding, defensive avoidance, proper response to a safety hazard, etc.) and driving conditions (e.g., congestion).

Vehicle communications also may include vehicle-to-infrastructure ("V2I") communications, such as transmissions from vehicles to non-vehicle responsive devices (i.e., infrastructure devices), for example, toll booths, rail road crossings, and road-side traffic monitoring devices. V2I communications may be performed similarly as described above with reference to V2V communications. Certain V2V communication systems may periodically broadcast data from a vehicle to any other vehicle, or other infrastructure device capable of receiving the communication, within the range of the vehicle's transmission capabilities. For example, a vehicle may periodically broadcast (e.g., every 0.1 second, every 0.5 seconds, every second, every 5 seconds, etc.) certain vehicle operation data via its short-range communication system, regardless of whether or not any other vehicles or reception devices are in range. In other examples, a vehicle communication system may first detect nearby vehicles and receiving devices, and may initialize communication with each by performing a handshaking transaction before beginning to transmit its vehicle operation data to the other vehicles and/or devices.

In still other examples, a mobile device may establish communication with an on-board vehicle system. For example, either the mobile device or a vehicle may be implemented with hardware (e.g., an input port or docking station) and/or software (e.g., network interfaces, secure protocols and encryption, etc.), and may be designed and configured to establish communication (using a wired or wireless connection) between the mobile device and an on-board vehicle system. For example, a smartphone or tablet computer, which is often carried by a user, may include an on-board vehicle system interface to detect and/or connect to an on-board vehicle system whenever the user is driving (and/or riding as a passenger) in a vehicle. After a mobile device establishes communication with an on-board vehicle system, which may be a telematics device, on-board diagnostic system, vehicle navigation device, or other vehicle computer system, the mobile device may receive vehicle sensor data collected by various vehicle sensors. Thus, smartphones or tablet computers may use vehicle interfaces to receive some or all of the same vehicle sensor data and driving data that is accessible to on-board vehicle systems, discussed above.

Based on the collected data from the one or more vehicles and/or infrastructure devices, the systems, methods, and apparatus determine one or more parties at-fault (if more than one party is at fault, determine the fault distribution), one or more potential or actual causes of the event, and/or one or more reactions to the event. In some examples, data from previous events (e.g., previous causation and/or fault determination data stored with an event database) may be used to determine the one or more parties at fault for a current event. Based on these example determinations, the systems, methods, and apparatus disclosed herein may be able to recognize event causations and, thus, identify or predict future events before they occur. For example, as further disclosed herein, machine learning algorithms may be utilized to identify warning signs of events and recognize future similar warning signs in order to predict an event is about to occur. The disclosed systems, methods, and apparatus may further transmit instructions to drivers for performing a vehicle maneuver to avoid and/or reduce the severity of an event or may instruct autonomous or semi-autonomous vehicles to avoid and/or reduce the severity of an event by transmitting programmed vehicle maneuvers (e.g., decelerate, accelerate, swerve left, swerve right, stop, reverse, etc.) to the vehicle. Such transmissions may occur at the time of the event (e.g., in real time) or may be transmitted prior to the event and determined to be presented/initiated at the time of the event.

An example system to determine fault of an accident and automatically initiate a response comprises a first vehicle comprising a first plurality of vehicle operation sensors to detect vehicle and environment parameters, a second vehicle comprising a second plurality of vehicle operation sensors, and a server comprising at least one processor, and memory comprising instructions that, when executed by the at least one processor, cause the server to identify an occurrence of an event involving the first vehicle and the second vehicle, store first data acquired by the first plurality of vehicle operation sensors for a first threshold amount of time prior to the event, during the occurrence of the event, and for a second threshold amount of time after the event, store second data acquired by the second plurality of vehicle operation sensors for a third threshold amount of time prior to the event, during the occurrence of the event, and for a fourth threshold amount of time after the event, identify, based on the first data and the second data, which vehicle of the first vehicle or the second vehicle is at-fault, aggregate the first data and second data into an event report, and initiate a response through a system associated with the vehicle identified as at-fault.

In some examples, the first vehicle is an autonomous vehicle.

In some examples, the event comprises at least one of a near miss or an accident involving at least one of the first vehicle or the second vehicle.

In some examples, wherein the instructions, when executed by the at least one processor, cause the server to generate, based on the first data and the second data, an event avoidance maneuver, and transmit, to the first vehicle and the second vehicle for avoiding and/or reducing the severity of other events similar to the event, the event avoidance maneuver.

In some examples, the instructions, when executed by the at least one processor, cause the server to verify at least a first portion of the first data with at least a second portion of the second data.

In some examples, the system further comprises a connected infrastructure device comprising a plurality of sensors to detect environment parameters. In some examples, environmental parameters include, without limitation, the date, time, location of the device (e.g., latitude and longitude, address, street, intersection, etc.), sensor and imagery data surrounding the device, weather conditions, climate data, and/or other collectable data within a radius of the device.

In some examples, the system further comprises a third vehicle not involved in the event, wherein the instructions, when executed by the at least one processor, cause the server to store third data acquired by a third plurality of vehicle sensors associated with the third vehicle, identify, based on the first data, the second data, and the third data, which vehicle of the first vehicle or the second vehicle is at-fault, and aggregate the first data, the second data, and the third data into the event report.

An example apparatus to determine a party at-fault in an event comprises one or more processors, and memory storing instructions that, when executed by the one or more processors, cause the apparatus to at least identify an occurrence of an event, store first data corresponding to apparatus operation for a first threshold amount of time prior to the event, during the occurrence of the event, and for a second threshold amount of time after the event, determine whether a responsive object is involved in or near the event, in response to determining that the responsive object is involved in or near the event, transmit the first data to the responsive object, and receive, from the responsive object, second data, analyze the first data and the second data to determine an at-fault party involved in the event, aggregate the first data and second data into an event report, and cause, automatically, a response to be initiated through a system associated with the at-fault party involved in the event.

In some examples, the responsive object is at least one of a connected vehicle or a connected infrastructure device.

In some examples, the event comprises at least one of a near miss or an accident involving at least one vehicle.

In some examples, the instructions, when executed, cause the apparatus to input the first data and the second data into autonomous vehicle operation machine learning algorithms.

In some examples, the instructions, when executed, cause the apparatus to transmit, to an emergency entity or a repair entity, the event report.

In some examples, the event is a first event and the instructions, when executed, cause the apparatus to query an event database for third data corresponding to a second event similar to the first event, and analyze the first data, the second data, and the third data to determine the at-fault party involved in the event.

In some examples, the first data and the second data comprise at least one of driver information, event images, vehicle information, date of event, time of event, location of vehicles, speed of vehicles, NHTSA level of autonomy of the vehicles, sensor data from vehicles involved, environmental conditions, vehicle control status information, vehicles onboard telematics data, driver behavior information, or any combination thereof.

In some examples, the instructions, when executed, further cause the apparatus to determine, based on the first data and the second data, a cause of the event.

In some examples, the event is a first event and the instructions, when executed, cause the apparatus to query an event database for third data corresponding to a second event similar to the first event, and analyze the first data, the second data, and the third data to determine a cause of the event An example method to automatically initiate an automatic response to an event comprises identifying an occurrence of the event, storing first data corresponding to apparatus operation for a first threshold amount of time prior to the event, during the occurrence of the event, and for a second threshold amount of time after the event, determining whether a responsive object is involved in or near the event, in response to determining that the responsive object is involved in or near the event, transmitting the first data to the responsive object, and receiving, from the responsive object, second data, analyzing the first data and the second data to determine an at-fault party involved in the event, aggregating the first data and second data into an event report, and causing, automatically, a response to be initiated through a system associated with the at-fault party involved in the event.

In some examples, the method further comprises inputting the first data and the second data into autonomous vehicle operation machine learning algorithms.

In some examples, the method further comprises transmitting, to an emergency entity and an infrastructure repair entity, the event report.

In some example, the method further comprises determining, based on the first data and the second data, a cause of the event.

FIG. 1 illustrates an example environment 100 comprising an event identifying and processing platform 102 in communication with a first vehicle 104 and/or a second vehicle 106 connected over a network 108. In some examples, the first vehicle 104 and/or the second vehicle 106 are autonomous or semi-autonomous vehicles. The network 108 may be a cellular network, WI-FI® network, Bluetooth network, near-field communication network, etc. In some examples, the event identifying and processing platform 102 is a remote server accessible by the first vehicle 104 and/or the second vehicle 106 via the network 108. Additionally, or alternatively, the first vehicle 104 and/or the second vehicle 106 may comprise the event identifying and processing platform 102 within or in communication with an on-board computer of the first vehicle 104 and/or the second vehicle 106. As disclosed herein, the first vehicle 104 and/or the second vehicle 106 may be involved in an event that may damage one or more portions of the first vehicle 104 and/or the second vehicle 106. It may be advantageous for the first vehicle 104 and/or the second vehicle 106 to comprise the event identifying and processing platform 102 such that network availability does not impact the operations described herein. As disclosed herein, the first vehicle 104 and/or the second vehicle 106 may be involved in an event that may damage one or more portions of the first vehicle 104 and/or the second vehicle 106. Accordingly, it may be advantageous for the event identifying and processing platform 102 to be installed on the first vehicle 104, the second vehicle 106, and as a remote server, as illustrated in FIG. 1.

The example event identifying and processing platform 102 comprises an example event detector 110, an example fault and causation identifier 112, an example reaction processor 114, an example event processor 116, an example communication link device 118, and an example vehicle database 120. The example event detector 110, the example fault and causation identifier 112, the example reaction processor 114, the example event processor 116, the example communication link device 118, and the example vehicle database 120 may be connected or otherwise be in communication via a communication channel such as, for example, bus 122. The example event identifying and processing platform 102, the example first vehicle 104, and/or the example second vehicle 106 may further be in communication with an example event database 124 over the example network 108. In some examples, the event database 124 may be located within the first vehicle 104 and/or the second vehicle 106 such that network unavailability does not impact the operations described herein.

The example event detector 110 may determine the occurrence of an event, such as for example, a vehicle collision. The example event detector 110 may receive data from one or more accelerometers, configured to detect a deceleration above a threshold. In examples wherein the event is a vehicle collision, the accelerometers may detect a deceleration above a first threshold. In examples wherein the event is a near miss, the accelerometers may detect a deceleration above a second threshold, wherein the first threshold is higher than the second threshold. In such examples, the accelerometers may detect an acceleration subsequent to the deceleration and within a threshold amount of time, which may be indicative of the vehicle slowing in response to the event and accelerating away after avoiding the event. All vehicle operations may be associated with data signatures like those described above (e.g., deceleration followed by acceleration may be associated with coming to a stop without incident, rapid deceleration followed by nothing may be associated with a vehicle collision, etc.).

Additionally, or alternatively, other sensors may be used to similarly detect an event. For example, range sensors may be used to determine when an object occupies the same space as the vehicle (e.g., the object is 0 inches away). Furthermore, one or more cameras may be utilized in combination with image recognition and one or more machine learning algorithms (e.g., decision trees, neural networks, etc.) to "learn" what events (e.g., a vehicle collision) and the moments before the events look like, so that the event detector 110 may make future predictions of when an event is about to occur and/or is occurring.

As used herein, machine learning may include generating one or more models using data from the example event database 124 and one or more algorithms. In some examples, supervised machine learning is utilized, wherein the one or more generated models are presented with inputs and outputs, and the machine learning algorithm determines one or more general rules to maps the inputs to outputs. For example, a subset of the data from the example event database 124, such as, for example, camera data associated with past events, may be used as input data and prediction of occurrence of an event may be identified as the output. From these inputs and output (i.e., a training data set), the machine learning algorithms may be able to map visual indications of a vehicle collision to a determination that a vehicle is involved in or about to be involved in an event. In such examples, the machine learning algorithms may be able to predict an event is about to occur in future situations. Of course, other subsets of data may be applied such as speed of vehicles, environmental conditions, time of the day, location of vehicles, vehicle control status information, driver behavior information, vehicle on-board telematics data or any combination thereof.

Machine learning may be applied, as disclosed herein, to identify specific conditions that lead to events from a vehicle's perspective. Predictive behaviors may be determined to avoid and/or reduce the severity of future events. For example, the example machine learning algorithms may be "trained" with camera feeds and/or image recognition data corresponding to previous vehicle collisions and/or one or more vehicle collision simulations such that the example event detector 110 may predict, with high accuracy, that an event (e.g., accident) is about to occur and/or is occurring in order to avoid and/or reduce the severity of the event.

In response to determining the occurrence of the event, the example event detector 110 may receive collected data from one or more vehicle operation sensors from one or more vehicles before, during, and after the event. In some examples, only data from a threshold amount of time before the event is stored. For example, data may be stored in 5 minute intervals and overwritten every 5 minutes until an event occurs, upon which the 5 minutes before the event would be stored. In such a way, data storage space may be saved because it may be unlikely that data from more than 5 minutes before an event would provide relevant information. Likewise, only data from a threshold of time after the event may be stored. As described above, it may be unlikely that data from more than 5 minutes after an event would provide relevant information. Of course, any threshold amount of time may be used without departing from the scope of this disclosure.

The collected data may be transmitted from the first vehicle 104 to the event detector 110 via the network 108. Additionally, or alternatively, the event identifying and processing platform 102 may be installed on the first vehicle 104 and the event detector 110 may be in direct communication with the one or more vehicle operation sensors and acquire data in this manner. The data may include the date, time, speed of vehicles involved in the event, vehicle identification number, license plate information, route/location of the event (e.g., latitude and longitude, address, street, intersection, etc.), sensor and imagery data, whether one or more vehicle components were working properly prior to the event, whether safety features are equipped/activated in a vehicle, NHTSA level of autonomy of the vehicle, whether the vehicle or driver was in control of the vehicle, communications from the vehicle to the driver, known driving conditions, known weather conditions, insurance policy, provider, and/or coverage information, type of damage, severity of damage, condition of the vehicle, insured/vehicle owners, number of passengers, whether seat belts were utilized, passenger weight, vehicle braking, estimate cost to replace/repair damage, etc.

The example fault and causation identifier 112 may determine, from the collected data, a causation of the event and distribute fault accordingly. Causation may be anything from faulty vehicle components, faulty repairs, faulty design, driver error, faulty infrastructure, weather conditions, etc. The example fault and causation identifier 112 may allocate fault to one or more vehicles, infrastructure, environmental conditions, etc. For example, if the data from the first vehicle 104 and/or the second vehicle 106 indicates the vehicles are at a location associated with a four way stop sign and if the data from the first vehicle 104 indicates a rapid acceleration from a stop and the data from the second vehicle 106 indicates a constant velocity and/or does not indicate any change in acceleration, the example fault and causation identifier 112 may determine that the second vehicle 106 ran a stop sign. In such an example, the second vehicle 106 running the stop sign (i.e., driver error) may be determined to be the cause of the event and may be allocated 100% fault. Further information may be determined from the data such as, for example, mechanical and/or electrical failure of the brakes of the second vehicle 106. In such an example, the mechanical and/or electrical brake failure may be determined to be the cause of the event and may be allocated 90% fault, while the driver of the second vehicle 106 may be allocated 10% fault for failing to test the brakes prior to the event.

In some examples, the example fault and causation identifier 112 may query the event database 124 for previous events similar to the event (e.g., an event at a same location, an event with a same vehicle, an event with a same environmental or infrastructural condition, etc.) to determine a causation or fault trend. For example, the example fault and causation identifier 112 may determine that a plurality of events have occurred at the event location, and the cause of each event was a pothole. Accordingly, the existence of the pothole may similarly be the cause of the present event. Similarly, a previous event similar to the event may indicate that the stop sign in which the second vehicle 106 ran was destroyed or otherwise removed. In such an example, the missing stop sign may be determined to be the cause of the event and the entity that removed the stop sign and/or failed to replace the stop sign in a threshold amount of time may be allocated 100% fault. Of course, other causations may be determined such as, for example, potholes, broken traffic signal, weather, debris, etc. In some examples, the fault and causation identifier 112 utilizes one or more machine learning algorithms to determine causes of particular events and match the causes to corresponding at-fault entities, using the data collected corresponding to an event, previous events, one or more previous event causations, and/or one or more vehicle collision simulations. Data from other events from the event database 124 may be included to support a cause or fault determination.

The example reaction processor 114 may identify any reactions taken in response to an event and may determine whether such reactions were successful in avoiding and/or reducing the severity of the event. For example, vehicles that avoid and/or reduce the severity of the event by swerving left or swerving right in a threshold amount of time may still provide event data indicating the reactions taken and whether the event was successfully avoided and/or the severity of the event was reduced (e.g., the severity of a collision where the brakes were applied one second before the collision may be lower than the severity of a collision where no brakes were applied). In some examples, the example reaction processor 114 generates an avoidance maneuver instruction based on previous successful event avoidance maneuvers. In some examples, the example reaction processor 114 issues, to one or more vehicles approaching an event, the generated avoidance maneuver instructions in response to determining a new event or predicted event is similar to previously avoided event. In some examples, the reaction processor 114 utilizes machine learning algorithms (e.g., neural networks, decision trees, etc.) to match avoidance maneuver instructions with new events.

Additionally, or alternatively, the example reaction processor 114 may determine, based on the collected data and/or additional data from the event database 124, one or more reactionary measures in response to an event. For example, the example reaction processor 114 may determine that the event has caused the location where the event occurred to be impassible and the example reaction processor 114 may determine an instruction should be transmitted to other vehicles to avoid the event location. The example reaction processor 114 may communicate to vehicles in the proximity of an event that a lane or lanes on the highway should be cleared for emergency vehicles. For example, the reaction processor 114 may display a message on a nearby digital billboard and/or display a message via on-board displays within vehicles in proximity to the event.

The example reaction processor 114 may, for example, determine a location is impassible by collecting range sensor data from one or more vehicles involved in an event and determining whether distances between other vehicles/infrastructure objects (e.g., a median, a curb, a highway divider, etc.) and the vehicle is large enough through which other vehicles may pass. Additionally, or alternatively, impassibility may correspond to the severity of the damage to the one or more vehicles involved in the event. For example, a fender-bender may not be sufficient to reroute other vehicles. However, vehicles may be rerouted when one or more vehicles involved in the event is totaled. Accordingly, in some examples, the example reaction processor 114 may determine that it should communicate, to all vehicles on route to the location, an instruction to update the vehicles' global positioning system to avoid the event.

Additionally, reactionary measures may be initiated as a result of the causation determination. The example reaction processor 114 may determine a causal trend in events at a location based on the data in the event database 124 and, based on the causal trend, the example reaction processor 114 may determine an action to be taken to eliminate the causation. One or more reactionary measures may be programmed into a set of rules, wherein each rule may comprise one or more criteria against which the collected data may be compared. If the collected data satisfies the one or more criteria for a given rule, the example reaction processor 114 may identify the associated reactionary measure to be taken. For example, if it is determined that a threshold number of different vehicles spin-out and cause events at a particular location, the example reaction processor 114 may determine that the slope/angle of the road may need to be adjusted to avoid such spin-outs. If a threshold number of events occur at an intersection with a yield sign, the example reaction processor 114 may determine the yield signed should be changed to a stop sign. If a threshold number of events occur in a turning lane when the traffic signal is changing, the example reaction processor 114 may determine a green turn arrow should be installed and/or the green turn arrow should be longer to fully empty the turn lane and avoid any last minute turning that may lead to events.

The example event processor 116 may aggregate the collected data, determine if the data is redundant, determine if the data is accurate, determine if additional data is needed, determine the extent of any damage to vehicles or infrastructure devices, determine repair or replacement costs, generate reports, generate insurance claims, process insurance claims, etc. The example event processor 116 may determine the amount of data that is collected, stored, processed, and/or transmitted based on the severity of the event and/or damage to the vehicles/infrastructure. For example, a minimum amount of information may be collected, stored, processed, and/or transmitted when a vehicle hits a pothole or is involved in a fender-bender. In contrast, when one or more vehicles or infrastructure devices are totaled, a maximum amount of data may be collected, stored, processed, and/or transmitted. Similarly, insurance claims may be classified, based on the severity of the event, as minor, major, total loss, or whatever classification is appropriate.

To determine the extent of damage to a vehicle, the event processor 116 may compare data from one or more sensors of a vehicle prior to an event to data from the one or more sensors of the vehicle during and/or after the event to determine any changes to the structure of the vehicle. Such changes may reflect damage done to a vehicle during the event. For example, the event processor 116 may identify functioning sensors prior to an event and determine non-functioning sensors after an event to determine damage to a particular area of a vehicle or infrastructure object. In some examples, impact sensors may be disposed at various locations of a vehicle and may report the forces applied to those various locations in order to determine a magnitude of damage to those locations. In some examples data from an on-board diagnostic system of the vehicle may be used to determine the status of various components of the vehicle and the magnitude of damage to those components. In some examples, external cameras on one or more vehicles involved in or in the vicinity of the event may identify external damage visually and damage estimates may be performed based on the visual camera data. The example event processor 116 may determine how much damage is done to which portions of the vehicle (and similarly to connected infrastructure devices). The example event processor 116 may utilize one of more machine learning algorithms to classify the extent of the damage (high, medium, low etc.) using the data from one or more sensors of the vehicle, data from previous events from the event database 124, and/or one or more collision simulations.

To determine the cost of repairs or replacement parts corresponding to the damage, the event processor 116 may communicate with one or more repair/replacement services for costs involved in repairing such damage. Additionally, or alternatively, the example event processor 116 may identify similar damage to vehicles in past events by querying the event database 124 and determining a cost for similar repairs/replacements. For example, sensor data from similar previous events may be aggregated to provide a severity model that is associated with repair costs. Additionally, images from vehicles and/or infrastructure devices may be used as visual correlations to the severity of damage and associated costs.

In some examples, the event processor 116 may compare the damage and/or costs of repairs/replacements to a threshold to determine whether it is even necessary to initiate an insurance claim or inform relevant entities. For example, a vehicle may hit a pothole and the event detector 110 may determine the hitting of the pothole is significant enough to identify as an event. However, based on the data collected before, during, and after hitting the pothole, the event processor 116 may determine that insignificant damage has occurred, and thus there is no need to involve additional parties.

The example communication link device 118 may send and/or receive data from other responsive devices, which may form an ad-hoc network of responsive devices (e.g., connected vehicles, connected traffic signals, traffic cameras, automatic telling machine cameras, infrastructure devices, etc.) described herein. The example communication link device 118 may send and/or receive data to one or more personnel including emergency services (e.g., EMTs, fire department, hospital staff, etc.), authorities (e.g., police), repair services (e.g., vehicle repair shops, infrastructure repair contractors, etc.), rental vehicle services, towing services, entities related to drivers of one or more vehicles (e.g., family members associated with insurance plan), insurance providers, etc. In some examples, the communication link device 118 might not send data based on whether the event processor 116 determines the event is significant enough (e.g., above a damage, cost, or the like, threshold) to involve additional entities.

The sent data may be in report form as generated by the example event processor 116. In some examples, the event report may be part of an application programming interface (API) that is accessible to multiple entities, vehicles, infrastructure devices, investigators, responders, etc. In such examples, the event report may be created or supplemented via multiple party collaboration. In some examples, the communication link device 118 transmits an insurance claim to an insurance provider (e.g., an insurance provider of the at-fault party and/or an insurance provider of the other parties). In such examples, the insurance claim may include the event report and/or documentation supporting the cause and fault determinations. For example, other similar event data from the event database 124 may be included as supporting material.

The example vehicle database 120 may be a computer readable storage medium or memory that stores vehicle identification information, driver identification information, and/or insurance information associated with a vehicle. In some examples, the vehicle database 120 may include information about additional parties related to the driver such as, for example, family members that may or may not be covered by the insurance policy associated with the vehicle. In some examples, the vehicle database 120 comprises the insurance coverage and a digital certificate. The example digital certificate may comprise information regarding the circumstances in which the insurance coverage would pay out compensation. Such a digital certificate may be exchanged between entities involved in an event so that the entities may automatically process compensation to repair/replace damages sustained during the event.

The example event database 124 may be a computer readable storage medium or memory that stores information associated with a plurality of previous events and/or event simulations. The event database 124 may include previous event reports detailing dates, times, speeds of vehicles involved in the event, vehicle identification numbers, license plate information, routes, locations of the events (e.g., latitude and longitude, address, street, intersection, etc.), sensor and imagery data, whether safety features were equipped/activated in a vehicle, NHTSA level of autonomy of the vehicle, whether the vehicle or driver was in control of the vehicle, communications from the vehicle to the driver, driving conditions, weather conditions, insurance coverage information, event reports, infrastructure devices data, insurance claim information (e.g., whether a claim was submitted, whether the claim was settled, the time taken to settle the claim, etc.), type of damage, severity of damage, parties informed (e.g., EMTs, insurance entities, infrastructure repair services, etc.), condition of the vehicle, insured/ vehicle owners, number of passengers, whether seat belts were utilized, passenger weight, vehicle braking, estimate cost to replace/repair damage, etc. Such data may be used by one or more machine learning algorithms for identification of new events, determining causes of the events, associated fault to entities involved in the event, determining reactionary measures, etc.

Figure 2:
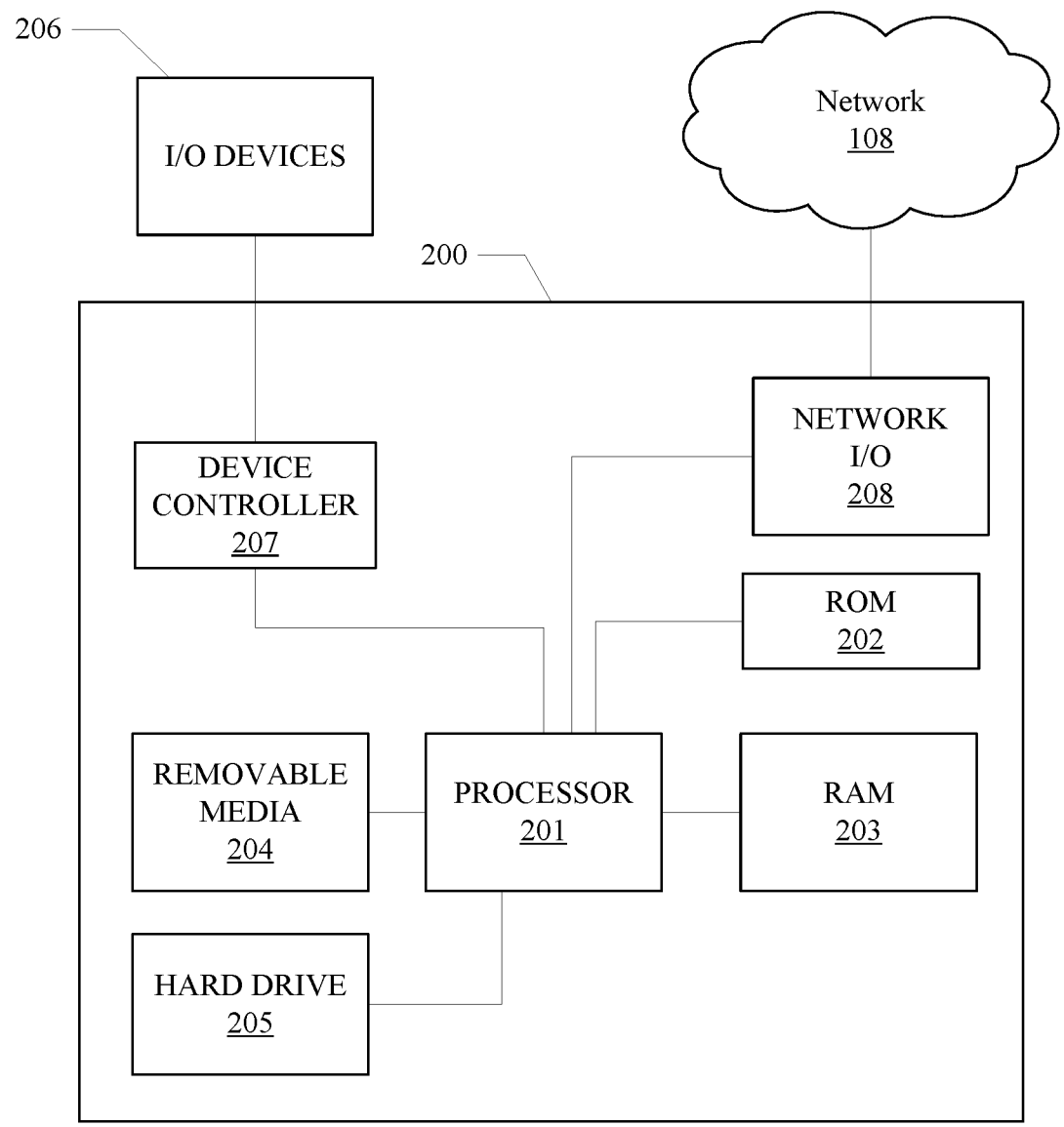
FIG. 2 illustrates an example computing device specifically configured to at least perform the method of FIG. 4 in accordance with one or more aspects described herein.

The example event detector 110, the example fault and causation identifier 112, the example reaction processor 114, the example event processor 116, the example communication link device 118, the example vehicle database 120, and/or more generally, the event identifying and processing platform 102, the example event database 124, and/or other computing devices described herein may each be implemented via a hardware platform such as, for example, the computing device 200 illustrated in FIG. 2. In some examples, the computing device 200 may implement the example event detector 110, the example fault and causation identifier 112, the example reaction processor 114, the example event processor 116, the example communication link device 118, the example vehicle database 120, and the example event database 124, such that all elements are incorporated into a single device. Some elements described with reference to the computing device 200 may be alternately implemented in software. The computing device 200 may include one or more processors 201, which may execute instructions of a computer program to perform any of the features described herein. The instructions may be stored in any type of tangible computer-readable medium or memory, to configure the operation of the processor 201. As used herein, the term tangible computer-readable storage medium is expressly defined to include storage devices or storage discs and to exclude transmission media and propagating signals. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more input/output devices 206, such as a display, touch screen, keyboard, mouse, microphone, software user interface, etc. The computing device 200 may include one or more device controllers 207 such as a video processor, keyboard controller, etc. The computing device 200 may also include one or more network interfaces 208, such as input/output circuits (such as a network card) to communicate with a network such as the example network 108. The network interface 208 may be a wired interface, wireless interface, or a combination thereof. One or more of the elements described above may be removed, rearranged, or supplemented without departing from the scope of the present disclosure.

FIGS. 3A-3E illustrate diagrams of an example intersection 300 wherein one or more vehicles are involved in or in the vicinity of an event. For example, a first vehicle 302 may be turning left and may collide with a second vehicle 304 traveling straight, causing an event 306. As disclosed herein, each of the first vehicle 302 and the second vehicle 304 may comprise one or more vehicle operation sensors. As illustrated in FIGS. 3A-3E, the one or more vehicle operation sensors may create sensory areas for the one or more vehicles. For example, the first vehicle 302 may have a first sensory area 308 and the second vehicle 304 may have a second sensory area 310. While the first sensory area 308 and the second sensory area 310 are depicted as circles, the first sensory area 308 and the second sensory area 310 may be any shape (e.g., square, rectangular, free-form, etc.). As further illustrated in FIG. 3A, the first sensory area 308 may extend into areas of the intersection 300 in which the second sensory area 310 does not, the second sensory area 310 may extend into areas of the intersection 300 in which the first sensory area 308 does not, and/or the first sensory area 308 may extend into areas of the intersection 300 in which the second sensory area 310 also extends.

In the illustrated example, each of the first vehicle 302 and the second vehicle 304 may comprise an event identifying and processing platform 102. As a result of the event 306, the first vehicle 302 may attempt communication with the second vehicle 304 (e.g., V2V communications) and any other responsive objects in the vicinity of the event 306 (e.g., V2I communications). If communication is successful, the first vehicle may communicate its collected data corresponding to the first sensory area 308 to at least the second vehicle 304. Similarly, the second vehicle 304 may communicate its collected data corresponding to the second sensory area 310 to at least the first vehicle 302. Additionally, or alternatively, both the first vehicle 302 and the second vehicle 304 may communicate its collected data to a remote event identifying and processing platform 102. In either case, the event identifying and processing platform 102 may collect data corresponding to the first sensory area 308 and/or the second sensory area 310 to determine a cause of the event, an at-fault party, whether an insurance claim should be initiated and by whom, etc. as disclosed herein.

In some examples, other responsive objects may be in the vicinity of the event 306. For example, in FIG. 3B, a third vehicle 312 with a corresponding third sensory area 314 may be able to communicate its collected data corresponding to the third sensory area 314 to the first vehicle 302 and/or the second vehicle 304. In FIG. 3C, a fourth vehicle 316 with a corresponding fourth sensory area 318 may be able to communicate its collected data corresponding to the fourth sensory area 318 to the first vehicle 302, the second vehicle 304, and/or the third vehicle 312. In FIG. 3D, a fifth vehicle 320 with a corresponding fifth sensory area 322 may be able to communicate its collected data corresponding to the fifth sensory area 322 to the first vehicle 302, the second vehicle 304, the third vehicle 312, and/or the fourth vehicle 316.

Figure 3A:
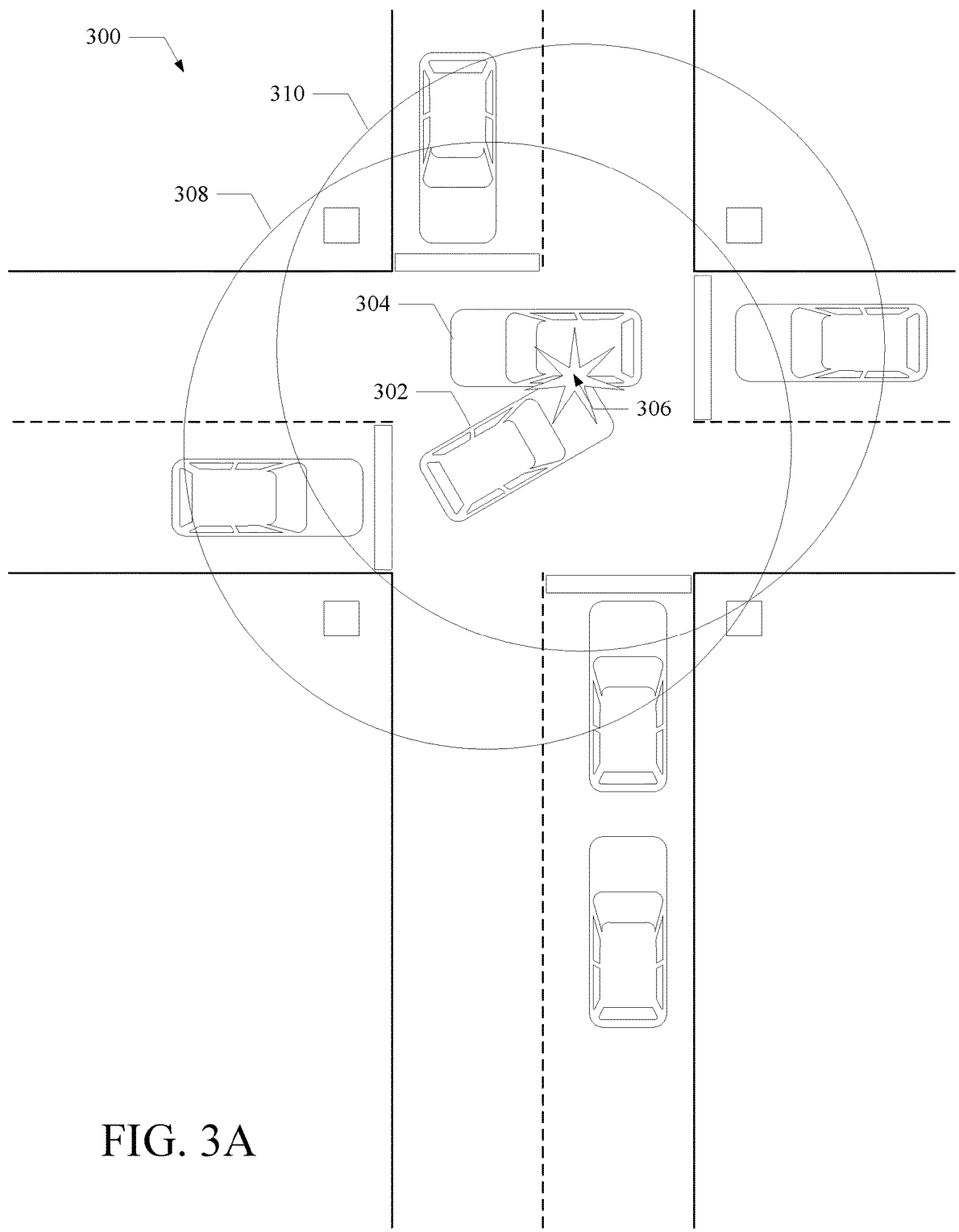
FIGS. 3A-3E illustrate diagrams of an example intersection wherein one or more vehicles are involved in or in the vicinity of an event in accordance with one or more aspects described herein.
Figure 3B:
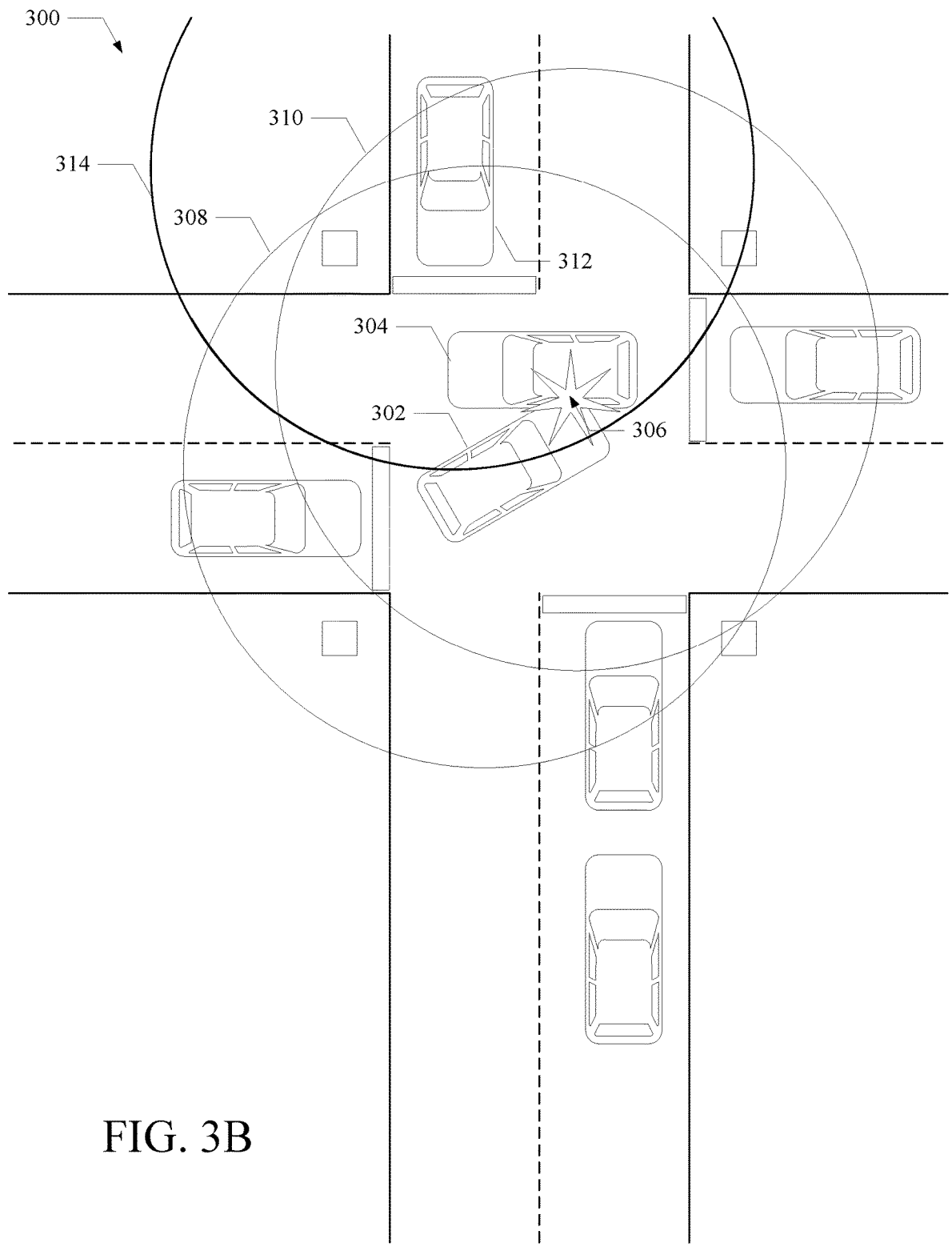
Figure 3C:
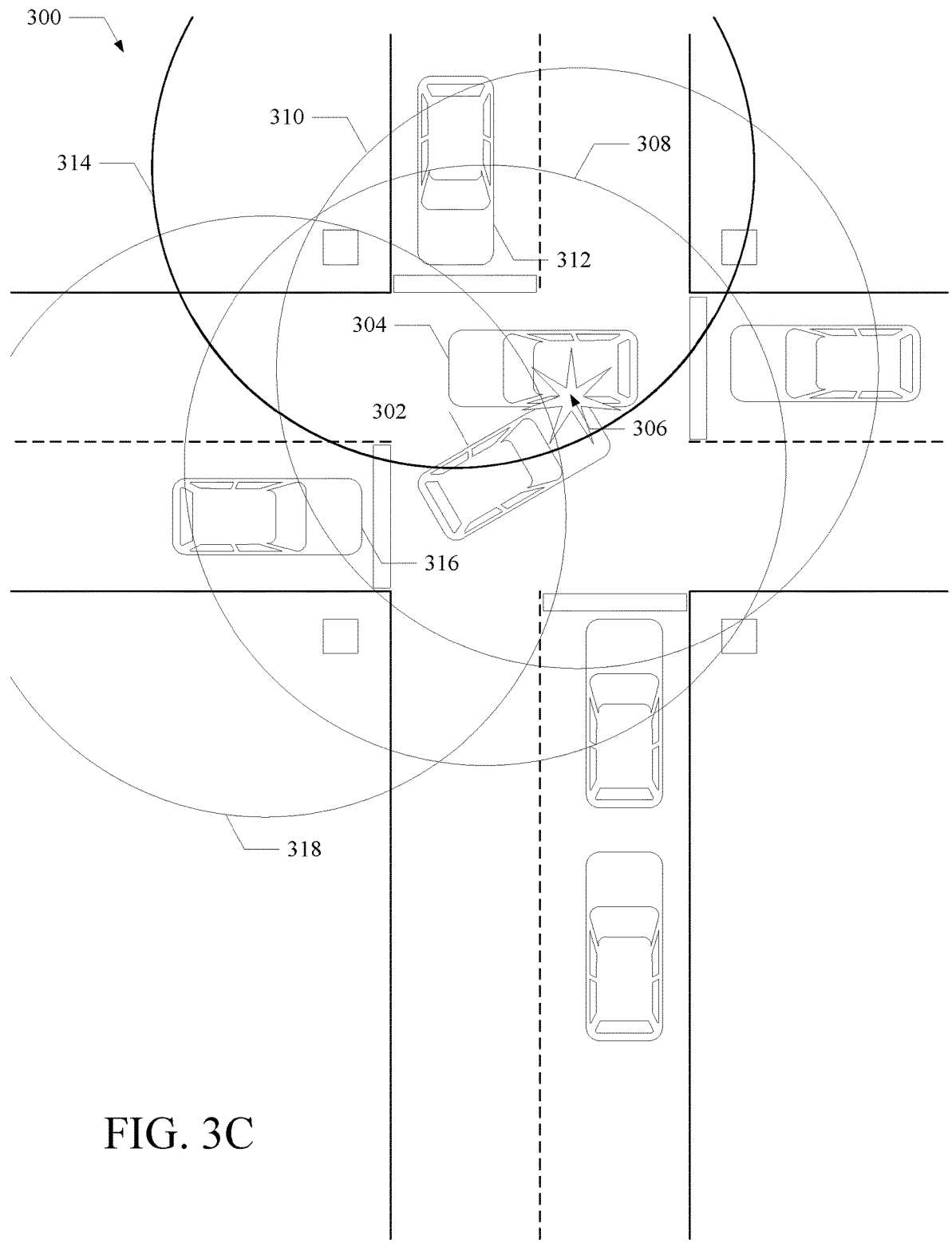
Figure 3D:
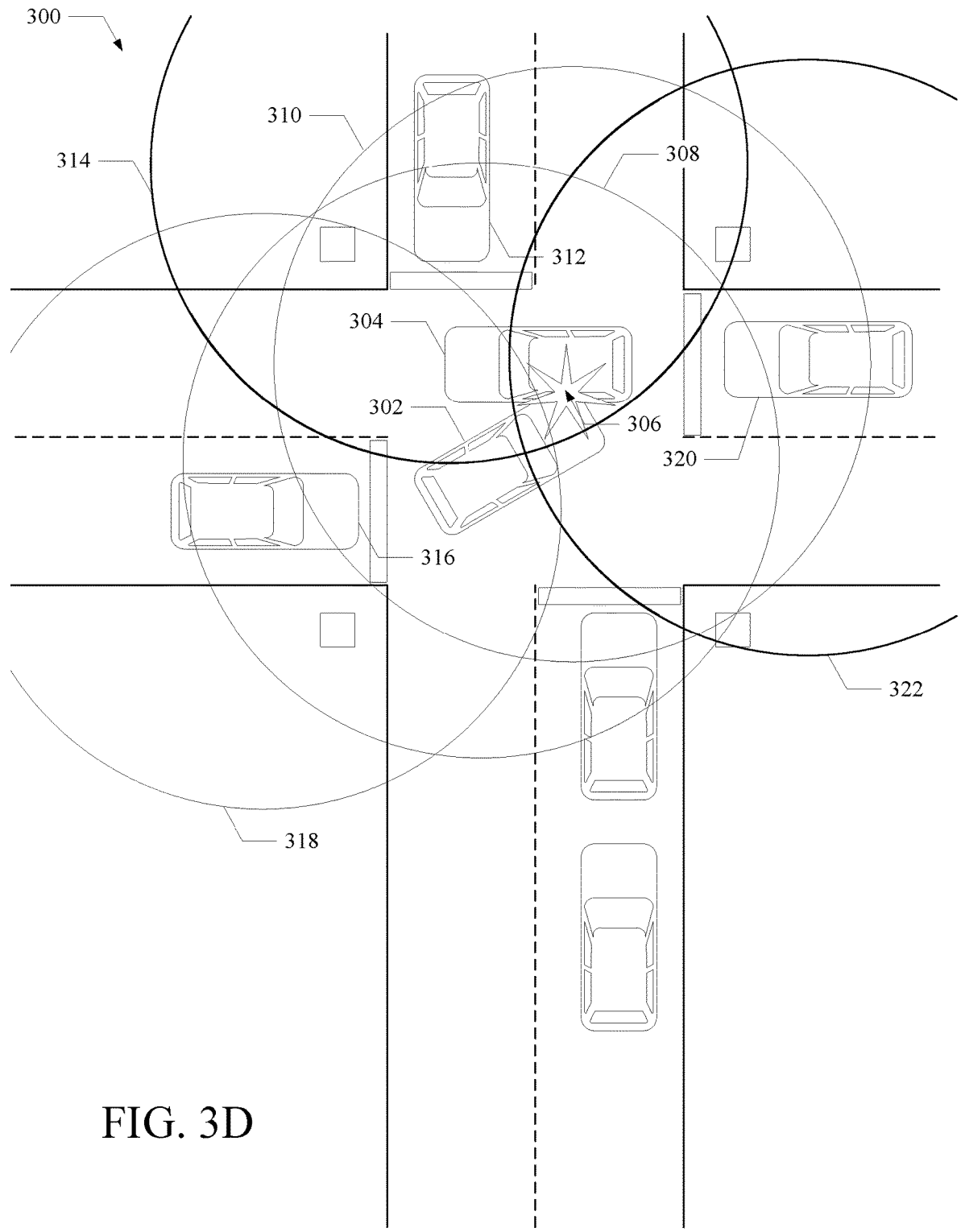
Figure 3E:
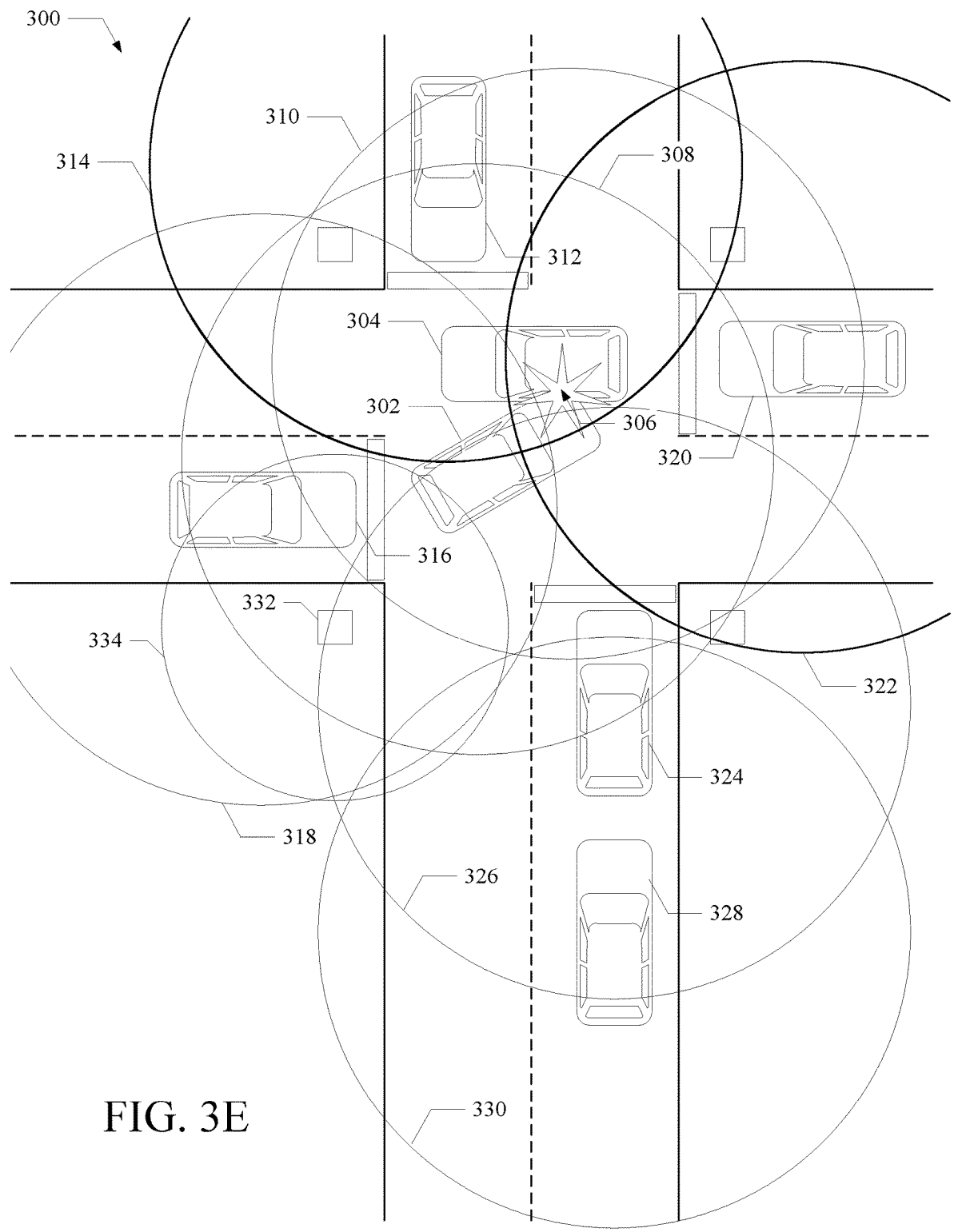

In FIG. 3E, a sixth vehicle 324 with a corresponding sixth sensory area 326 and a seventh vehicle 328 with a corresponding seventh sensory area 330 may be able to communicate their collected data corresponding to the sixth sensory area 326 and the seventh sensory area 330 to the any of the vehicles 302, 304, 312, 316, 320, 324, 328. Additionally, or alternatively, one or more infrastructure devices 332 (e.g., a connected traffic signal) with a corresponding sensory area 334 may communicate its collected data corresponding to the sensory area 334 to the any of the vehicles 302, 304, 312, 316, 320, 324, 328. Similarly, any of the vehicles 302, 304, 312, 316, 320, 324, 328 may communicate its collected data to the one or more infrastructure devices 332. In such examples, the one or more infrastructure devices 332 may react, based on the collected data, to the event 306. For example, the one or more infrastructure devices 332 may change all traffic signals to red (continuous red or flashing red), allow left and/or right turns but no green light, etc. in order to alleviate traffic congestion.

In some examples, all data from all vehicles 302, 304, 312, 316, 320, 324, 328 and infrastructure devices 332 may be collected in response to the event 306. Alternatively, as the event identifying and processing platform 102 begins to aggregate data collected from one or more vehicles and/or infrastructure devices, the event identifying and processing platform 102 may determine whether additional information is required and may query other vehicles and/or infrastructure devices in the vicinity of the event for such additional information.

As illustrated in FIGS. 3A-3E, an ad-hoc network of vehicles and infrastructure devices may be created to aggregate data from multiple perspectives as a result of an event. The aggregated data may be presented as an overview of the event with each perspective. Additionally, or alternatively, data from each vehicle and infrastructure device may be presented individually to focus on individual perspectives. In some examples, data from multiple perspectives may be redundant. In some examples, such data from multiple perspectives may allow the identification of phantom entities. A phantom entity may be an entity that ultimately caused an event to occur, but is otherwise not directly involved in the event. In such examples, the phantom entity may not be in the vicinity of an event caused by the phantom entity. However, the above disclosed ad-hoc network may continually expand outwardly from the event so long as additional vehicles and/or infrastructure devices are within range of other vehicles and/or infrastructure devices. Machine learning algorithms may be used to determine an optimal range for the ad-hoc network to expand before all data collected is redundant or irrelevant.

Figure 4:
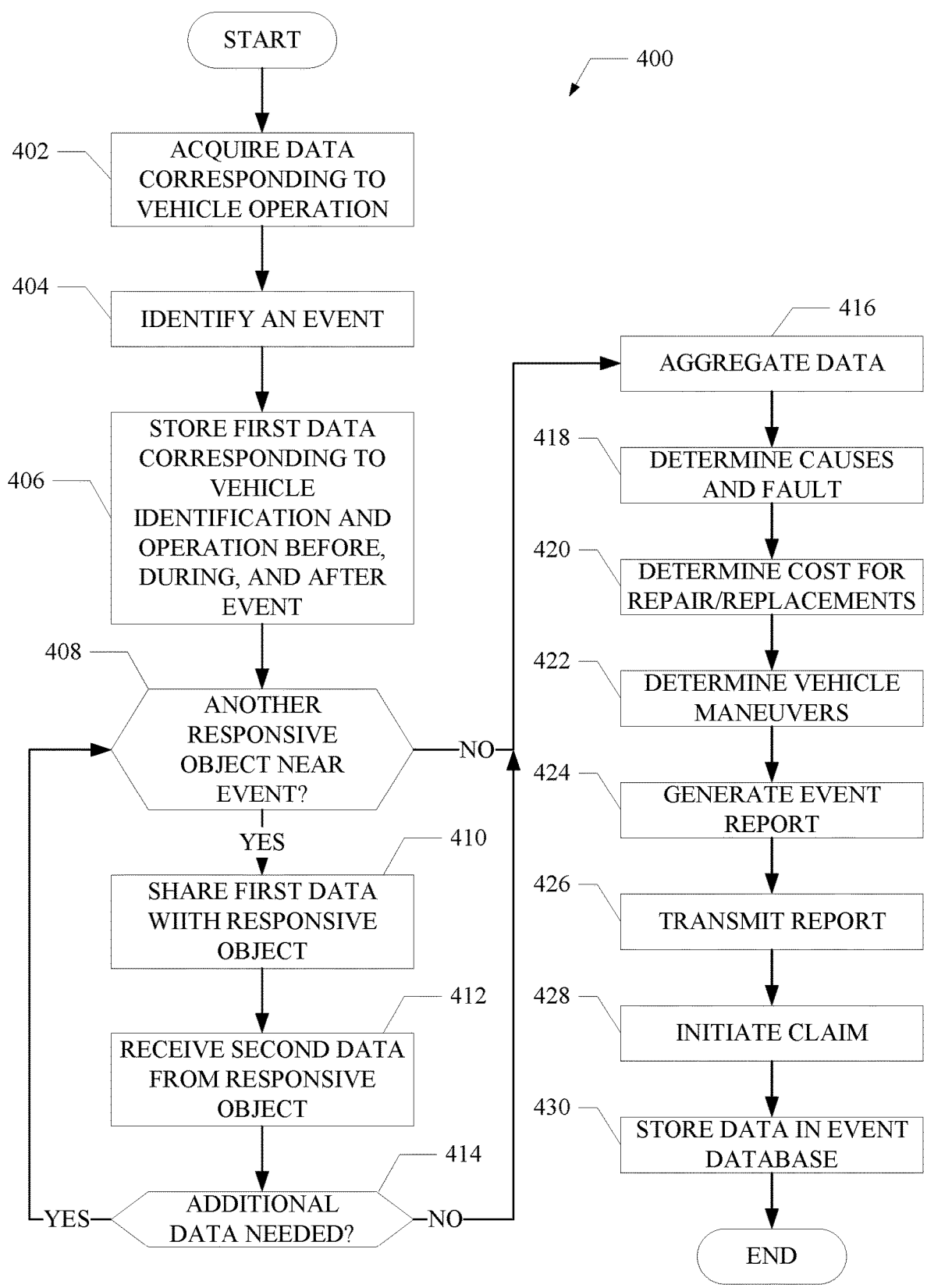
FIG. 4 is a flow chart illustrative of a process for implementing an example event-based connected vehicle control and response system in accordance with one or more aspects described herein.

FIG. 4 illustrates a flow chart illustrating a process for implementing an example event-based connected vehicle control and response system in accordance with one or more aspects described herein. In some examples, the process may be executed via machine readable instructions that, when executed, may cause an event identifying and processing platform 102 in a vehicle (e.g., first vehicle 302 (FIG. 3A)) to implement a process 400. The example process 400 begins at block 402, wherein one or more sensors are recording or otherwise collecting data corresponding to the vehicle's operation. As disclosed herein, the amount of data that is collected, stored, processed, and/or transmitted may be proportionate to the severity of the event. In some examples, the frequency of data collection may also vary. For example, sensor data may be collected periodically at predetermined intervals, continuously, may be monitored continuously and only collected (i.e., recorded) upon the occurrence of an event, etc. In some examples, all sensor data may be continuously collected, but only sensor data corresponding to event detection may be continuously analyzed until an event occurs. Thereafter, all data may be analyzed (e.g., serially, in parallel, on-demand, etc.) in order to conserve on-vehicle or on-infrastructure device computing resources.

At block 404, the example event detector 110 identifies an event, such as, for example, event 306 (FIG. 3A). At block 406, the example event detector 110 stores first data corresponding to the identification of the vehicle and its operation before the event, during the event, and after the event. For example, the example event detector 110 may query the vehicle database 120 for driver and insurance provider information associated with the first vehicle 302. Additionally, the example event detector 110 may collect the sensor data for the first vehicle 302 surrounding the event 306. At block 408, the example communication link device 118 may determine whether there is another responsive object near the event (e.g., second vehicle 304, infrastructure device 332, etc.). For example, the example communication link device 118 may send out a ping and wait for a reply. If the example communication link device 118 determines that there is another responsive object near the event (block 408: YES), control proceeds to block 410.

At block 410, the example communication link device 118 (of the first vehicle 302) may share the first data with the responsive object (e.g., second vehicle 304), e.g., via vehicle-to-vehicle communications, vehicle-to-infrastructure communications, or the like. At block 412, the responsive object may transmit back second data, which the example communication link device 118 (of the first vehicle 302) may receive. At block 414, the example event processor 116 may determine whether additional data is needed. If additional data is needed (block 414: YES), control returns to block 408.

As disclosed herein, the example process 400 may loop between blocks 408 and 414 so long as there are responsive objects within range of at least one vehicle or infrastructure device and/or the data acquired by such responsive objects is non-redundant. In such a manner, large vehicle and/or infrastructure device ad-hoc networks may be formed that share data from multiple perspectives such that fault determinations and reactionary measures may be determined with high accuracy. If additional data is not needed (block 414: NO), or if at block 408, the example communication link device 118 determines that there is no other responsive object near the event (block 408: NO), control proceeds to block 416. At block 416, the example event processor 116 aggregates the collected data. In some examples, the example event processor 116 eliminates redundant information. In some examples, redundant information may be used to verify accuracy of the collected data.

At block 418, the example fault and causation identifier 112 analyzes the aggregate data to determine causes of the event 306 and/or determine fault. As disclosed herein, causation may be assigned to a single cause or may be associated with numerous causes. In some examples, the example fault and causation identifier may query event database 124 and use machine learning algorithms to determine the causes of the event 306 and/or determine fault. As disclosed herein, fault may be assigned to a single party (e.g., 100% at fault) or may be distributed amongst the parties involved in the event 306 (e.g., first vehicle 302 is 20% at fault, second vehicle 304 is 70% at fault, another vehicle is 10% at fault, etc.).

At block 420, the example event processor 116 may determine the cost for repairing any damage and/or replacing any components of vehicles and/or any components of infrastructure. For example, the event processor 116 may compare data from one or more sensors of a vehicle prior to an event to data from the one or more sensors of the vehicle during and/or after the event to determine any changes to the structure of the vehicle. Such changes may reflect damage done to a vehicle during the event. The example event processor 116 may determine how much damage is done to which portions of the vehicle (and similarly to connected infrastructure devices). The event processor 116 may communicate with one or more repair/replacement services for costs involved in repairing such damage. Additionally, or alternatively, the example event processor 116 may identify similar damage to vehicles in past events by querying the event database 124 and determining a cost for similar repairs/replacements.

At block 422, the example reaction processor 114 may determine, based on the aggregate data, one or more vehicle maneuvers to avoid and/or reduce the severity of the event 306. In some examples, the reaction processor 114 may determine, based on the aggregate data, reactionary measures to prevent events before they occur (e.g., fix a pothole, add a traffic signal, etc.). As disclosed herein, the example communication link device 118 may transmit such vehicle maneuvers to one or more vehicles within the vehicle and/or infrastructure device ad-hoc network to inform other vehicles of the event. Autonomous vehicles may receive the one or more vehicle maneuvers and implement them accordingly (e.g., via a vehicle control computing device controlling operation of the autonomous vehicle). Non-autonomous or semi-autonomous vehicles may present the one or more vehicle maneuvers to drivers of the non-autonomous or semi-autonomous vehicles. Accordingly, other vehicles not involved in the event may be instructed to avoid the event and/or similar events based on the data collected by the vehicles involved in the event.

At block 424, the example event processor 116 generates, based on the aggregate data, causes, faults, repair/replacement costs, and/or determined reactionary measures, an event report. The example event processor 116 may format the event report as a police report. Alternatively, the event report may be formatted to report the aggregated data in a user-friendly way. At block 426, the example communication link device 118 transmits the report to any number of parties including, without limitation, emergency personnel, local authorities, infrastructure repair services, automobile repair services, insurance services, automobile towing services, infrastructure clearing services, etc.

At block 428, the example event processor 116 may initiate an insurance claim for an insurance provider of the at-fault party (or parties). For example, the event processor 116 may utilize the insurance provider information from the vehicle database 120 of the party (or parties) at-fault and the event report to generate an insurance claim. In some examples, the communication link device 118 may submit the insurance claim to the insurance provider. In some examples, the event processor 116 may process the insurance claim automatically on site. For example, a vehicle's coverage and promise to pay may be stored as a digital certificate in the vehicle database 120. In response to the fault and causation identifier 112 determining that a vehicle is at-fault, the example communication link device 118 of the vehicle at-fault may transmit the corresponding digital certificate to the other vehicles involved in the event. In some examples, the event processor 116 may process received digital certificates to acquire compensation for any damage or injuries sustained as a result of the event. In some examples, the compensation may be credits for repairs/replacements based on the determinations at block 420.

At block 430, the example communication link device 118 may send, to the event database 124 for storage, the event report and any actions taken associated with the event. For example, the event database 124 may store whether authorities were informed of the event, whether an insurance claim was submitted, whether a submitted insurance claim was settled, how long did it take for the insurance claim to be settled, were infrastructure repair services informed, how long did it take for infrastructure to be repaired after being informed, were vehicle repair services informed, how long did it take for the vehicles to be repaired after being informed, how much did repairs/replacements cost, etc. All such data may be stored in the event database 124 for future use. As disclosed herein, machine learning algorithms may access the event database 124 for input data in respective determinations disclosed herein. Accordingly, as the event database 124 is updated with new information (e.g., as new events occur), the machine learning algorithms may be further trained, validated, and/or refined for improved accuracy. Thereafter, the example process 400 ceases operation.

While process 400 is described referencing an event identifying and processing platform 102 installed in a vehicle, a remote instance of the event identifying and processing platform 102 may similarly perform such operations. For example, the remote instance of the event identifying and processing platform 102 may acquire data from vehicles and infrastructure devices. From which, the remote instance of the event identifying and processing platform 102 may detect an event, determine causation and faults, determine reactions and reactionary measures, process the event data, and transmit reports, claims, etc. to appropriate parties.

As disclosed herein, the systems, methods, and apparatus may initiate, based on the collected data and through an insurance provider of the at-fault party, accurate insurance claims thereby eliminating the need to identify the parties involved in the event and/or the respective insurance providers, reducing negotiation of fault and/or who should submit an insurance claim, reducing duplicative claims from multiple parties involved in an event, reducing the number of parties involved in settling an insurance claim, reducing claim handling costs, reducing fraudulent insurance claims, etc.

The above discussed embodiments are simply examples, and modifications may be made as desired for different implementations. For example, steps and/or components may be subdivided, combined, rearranged, removed, and/or augmented; performed on a single device or a plurality of devices; performed in parallel, in series; or any combination thereof. Additional features may be added.

What is claimed is:

1. A method comprising:
   receiving, from a first vehicle, sensor data collected by a plurality of sensors of the first vehicle, wherein the plurality of sensors are configured to collect sensor data associated with the first vehicle and corresponding environmental conditions,
   identifying, based on the sensor data, an event involving the first vehicle and a second vehicle;
   determining, based on analyzing the sensor data, which vehicle of the first vehicle or the second vehicle is at-fault in the event;
   comparing sensor data prior to the event with sensor data after the event to determine damages;
   determining associated costs of the damages resulting from the event, wherein the sensor data is provided to a severity model to determine the associated cost; and
   initiating an automatic processing of compensation associated with the damages resulting from the event for at least a portion of the associated costs resulting from the event.

2. The method of claim 1 further comprising:
   causing the determined at-fault vehicle to transmit, to a server, a digital certificate configured to authenticate the automatic processing of the compensation associated with the damages resulting from the event.

3. The method of claim 2, wherein initiating the automatic processing of the compensation is based on receiving the digital certificate.

4. The method of claim 1, wherein determining which vehicle of the first vehicle and the second vehicle is at-fault in the event includes allocating a portion of fault to the first vehicle.

5. The method of claim 1, wherein determining which vehicle of the first vehicle and the second vehicle is at-fault in the event includes allocating a portion of fault to the second vehicle.

6. The method of claim 1 further comprising:
   determining one or more causal trends based on stored data in an event database including the sensor data.

7. The method of claim 6 further comprising:
   determining that a threshold number of events have occurred based on the one or more causal trends; and
   determining a reactionary measure to avoid a subsequent event based on the one or more causal trends.

8. A non-transitory computer-readable medium storing instructions thereon, wherein the instructions, when executed by one or more processors, cause the one or more processors to perform operations comprising:
   receiving, from a first vehicle, sensor data collected by a plurality of sensors of the first vehicle, wherein the plurality of sensors are configured to collect sensor data associated with the first vehicle and corresponding environmental conditions,
   identifying, based on the sensor data, an event involving the first vehicle and a second vehicle;
   determining, based on analyzing the sensor data, which vehicle of the first vehicle or the second vehicle is at-fault in the event;
   comparing sensor data prior to the event with sensor data after the event to identify non-functioning sensors to determine damage to the vehicle;
   determining associated costs of the damages resulting from the event; and
   initiating an automatic processing of compensation associated with the damages resulting from the event for at least a portion of the associated costs resulting from the event.

9. The non-transitory computer-readable medium of claim 8, wherein the instructions, when executed by the one or more processors, cause the one or more processors to further perform operations comprising:
   causing the determined at-fault vehicle to transmit, to a server, a digital certificate configured to authenticate the automatic processing of the compensation associated with the damages resulting from the event.

10. The non-transitory computer-readable medium of claim 9, wherein initiating the automatic processing of the compensation is based on receiving the digital certificate.

11. The non-transitory computer-readable medium of claim 8, wherein determining which vehicle of the first vehicle and the second vehicle is at-fault in the event includes allocating a portion of fault to the first vehicle.

12. The non-transitory computer-readable medium of claim 8, wherein determining which vehicle of the first vehicle and the second vehicle is at-fault in the event includes allocating a portion of fault to the second vehicle.

13. The non-transitory computer-readable medium of claim 8, wherein the instructions, when executed by the one or more processors, cause the one or more processors to further perform operations comprising:
   determining one or more causal trends based on stored data in an event database including the sensor data.

14. The non-transitory computer-readable medium of claim 13, wherein the instructions, when executed by the one or more processors, cause the one or more processors to further perform operations comprising:
   determining that a threshold number of events have occurred based on the one or more causal trends; and
   determining a reactionary measure to avoid a subsequent event based on the one or more causal trends.

15. A system comprising:
   a processor; and
   a non-transitory memory storing computer-executable instructions thereon, wherein the computer-executable instructions, when executed by the processor, cause the processor to perform operations comprising:
   receiving, from a first vehicle, sensor data collected by a plurality of sensors of the first vehicle, wherein the plurality of sensors are configured to collect sensor data associated with the first vehicle and corresponding environmental conditions, identifying, based on the sensor data, an event involving the first vehicle and a second vehicle;
determining, based on analyzing the sensor data, which vehicle of the first vehicle or the second vehicle is at-fault in the event;
comparing sensor data prior to the event with sensor data after the event to determine damages, wherein the sensor data comprises data from at least one impact sensor capable of recording forces applied to a portion of the vehicle;
determining associated costs of the damages resulting from the event; and
initiating an automatic processing of compensation associated with the damages resulting from the event for at least a portion of the associated costs resulting from the event.

16. The system of claim 15, wherein the computer-executable instructions, when executed by the processor, cause the processor to further perform operations comprising:
causing the determined at-fault vehicle to transmit, to a server, a digital certificate configured to authenticate the automatic processing of the compensation associated with the damages resulting from the event.

17. The system of claim 16, wherein initiating the automatic processing of the compensation is based on receiving the digital certificate.

18. The system of claim 15, wherein determining which vehicle of the first vehicle and the second vehicle is at-fault in the event includes allocating a portion of fault to the first vehicle.

19. The system of claim 15, wherein determining which vehicle of the first vehicle and the second vehicle is at-fault in the event includes allocating a portion of fault to the second vehicle.

20. The system of claim 15, wherein the computer-executable instructions, when executed by the processor, cause the processor to further perform operations comprising:
determining one or more causal trends based on stored data in an event database including the sensor data.

* * * * *